US008677683B2

(12) United States Patent
Doolittle

(10) Patent No.: US 8,677,683 B2
(45) Date of Patent: Mar. 25, 2014

(54) INJECTION TIP FOR USE WITH AN INJECTOR FOR INJECTING LIQUID CHEMICAL INTO A TREE

(76) Inventor: Glayne Doolittle, Omaha, NE (US)

( * ) Notice: Subject to any disclaimer, the term of this patent is extended or adjusted under 35 U.S.C. 154(b) by 430 days.

(21) Appl. No.: 13/136,906

(22) Filed: Aug. 15, 2011

(65) Prior Publication Data

US 2013/0042526 A1 Feb. 21, 2013

(51) Int. Cl.
*A01G 7/06* (2006.01)
(52) U.S. Cl.
USPC .................................................. 47/57.5
(58) Field of Classification Search
USPC .................................................. 47/57.5
See application file for complete search history.

(56) References Cited

U.S. PATENT DOCUMENTS

| | | | |
|---|---|---|---|
| 2,116,591 A | 11/1937 | Barber | |
| 3,304,655 A | 2/1967 | Mauget | |
| 3,608,239 A | 9/1971 | Tucker | |
| 5,046,281 A | 9/1991 | Murphy | |
| 5,239,773 A | 8/1993 | Doolittle, Jr. | |
| 5,797,215 A | 8/1998 | Doolittle et al. | |
| 5,901,498 A * | 5/1999 | Higgins | 47/57.5 |
| 7,178,286 B1 | 2/2007 | Doolittle | |

FOREIGN PATENT DOCUMENTS

| | | | | |
|---|---|---|---|---|
| EP | 111254 A1 * | 6/1984 | | A01G 7/06 |
| WO | WO 2012114197 A2 * | 8/2012 | | A01G 7/06 |

* cited by examiner

*Primary Examiner* — Frank T Palo
(74) *Attorney, Agent, or Firm* — Dennis L. Thomte; Thomte Patent Law Office LLC

(57) ABSTRACT

An apparatus is disclosed for injecting liquid chemicals directly into the trunk of a tree with the apparatus having a tapered, wedged-shaped needle on the end of an injection tip which is detachably secured to an injector. The injection tip includes a spring-loaded valve which is opened when the injection tip is secured to the injector to permit the chemical to flow therethrough. After the injection needle has been injected into the tree, the injector is disconnected from the injection tip. After a predetermined length of time has expired, the operator may manually open the valve to determine if the liquid chemical pressure within the tree has diminished to enable the injection tip to be removed from the tree.

3 Claims, 4 Drawing Sheets

INJECTION TIP FOR USE WITH AN INJECTOR FOR INJECTING LIQUID CHEMICAL INTO A TREE

BACKGROUND OF THE INVENTION

1. Field of the Invention

This invention relates to a tree injection system and more particularly to an apparatus for injecting liquid chemicals directly into the trunk of a tree, the apparatus having a tapered, wedge-shaped needle on the end of an injection tip having a liquid-conducting passageway in the center of the needle leading to an ejector hole which will conduct liquid chemicals to the outer surface of the needle.

2. Description of the Related Art

Tree injection is the operation of making a cut in a tree and then placing a dose of liquid chemical into the cut. There are several known methods by which this operation may be done. Generally, a cut is made manually by means of an ax or other such hand tool. The cut must be of such a shape and angle as to allow the introduced chemical to remain in the cut while the tree absorbs and transports the chemical throughout the tree. To efficiently accomplish this operation, the cut must be of sufficient size to accommodate the chemical injector. This often results in damage being done to the tree itself, which is acceptable if the goal is to eventually kill the tree, but completely unacceptable if the goal is to improve the health of the tree.

Furthermore, many of the prior art methods of tree injection involve a two-step operation which can be time consuming and involve considerable manual effort. Also, as the operation involves two steps, there is a delay between making the cut into the tree and introducing the chemical to the cut, which is critical as trees have the ability to quickly heal up incisions protecting them from entry of bacteria or other such harmful organisms.

An example of the prior art which attempts to address these problems is Murphy, U.S. Pat. No. 5,046,281, which discloses an attachment for a handgun with a moveable piston to which is attached a blade to form a cut in a tree, and a fluid injection means which instantaneously supplies a fluid dosage to the cut. The fuel to operate the handgun, together with the fluid to be applied to the cut, are preferably provided in a backpack. While this invention applies liquid instantaneously when the cut is formed, the problem is that the cut is formed by a blade being thrust into the tree thus opening a large hole and causing damage to the surrounding tree tissue. Furthermore, to operate the apparatus, an operator must carry a backpack which holds the fuel and fluid to be injected. This situation does not present a problem when an operator is injecting one tree a day, but on such places as tree farms, an operator may inject hundreds or thousands of trees in a day, involving considerable walking and bending. Carrying such a backpack can result in various degrees of back and leg strain, due to the additional weight thereof. There is therefore a need for a relatively lightweight tree injection apparatus which can inject trees while causing a minimum of damage to the tree tissue.

Other examples of the prior art have used other means of injecting plants, such as needles or the like. Examples of such art are found in Mauget, U.S. Pat. No. 3,304,655, and Barber, U.S. Pat. No. 2,116,591; both disclose injection systems having a needle. However, the problem encountered in utilizing both examples of the prior art is that before the needle may be inserted into a tree, a hole must be formed in the tree, or the needle will be plugged by tree fiber when it is inserted. Generally, at least a ⅛-inch hole needs to be drilled in the tree to insert the needles of the above inventions, which causes a great deal of damage to a tree, which is not a good way to save a tree. Moreover, both of these examples require a two-step operation to achieve injection of a tree.

Finally, one other example of the prior art which addresses this problem is Tucker, U.S. Pat. No. 3,608,239, which discloses a tree killing poison injector nozzle comprising a tube having a wedge-shaped end portion for entering a cut formed in a tree. The opposing sides of the wedge-shaped end are cut away to define an opening at each of its sides. A poison directing guard, surrounding the tube, forms laterally open channels lying in the plane of the wedge-shaped end. Once again, however, such an injection system is fine for use if the goal is to kill the tree. If the goal is to improve the health of the tree, however, use of the Tucker invention surely will not achieve the desired end. Furthermore, the cut formed by use of the Tucker device is much larger than is desirable to prevent harm to the tree. Finally, fluid is released from nozzles a substantial distance behind the tree cutting edge, thus resulting in a deeper cut having to be made, causing more damage to the tree.

Applicant's earlier patent, U.S. Pat. No. 5,239,773, solved many of the problems associated with the prior art tree injection systems. It has been found that it would be advantageous if the injection tip and needle thereon could be left in the tree, after the liquid chemical is injected into the tree, until such time as the liquid chemical has been absorbed by the tree and that it would also be advantageous if the person performing the injection method could readily determine if the liquid chemical had been absorbed by the tree prior to removing the injection tip and needle from the tree.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An injection tip is disclosed for use with an injector for injecting liquid chemical into a tree. The injector has forward and rearward ends with the injector having a quick coupler at its forward end which has a first liquid passageway formed therein. The injector has a second liquid passageway formed therein which communicates with the first passageway and which extends therefrom. The second liquid passageway is in communication with the liquid to be injected into the tree. The injection tip includes a body portion having forward and rearward ends. The rearward end of the body portion of the injection tip is adapted to be received by the quick coupler of the injector. The body portion of the injection tip has a third passageway formed therein extending therethrough which has forward and rearward ends. A normally closed, spring-loaded valve assembly is selectively removably secured in the rearward end of the third liquid passageway. The valve assembly includes a valve seat, having a rearward liquid intake side and a forward liquid discharge side, a movable valve member positioned forwardly of the valve seat which is movable between open and closed positions with respect to the liquid discharge side of the valve seat, a spring associated with the valve member which yieldably maintains the valve member in its closed position, and an elongated valve actuator having forward and rearward ends.

The forward end of the valve actuator is operatively secured to the valve member with the valve actuator extending rearwardly from the valve member. The rearward end of the valve actuator is positioned rearwardly of the rearward end of the body portion of the injection tip so that the valve actuator may be manually moved forwardly to move the valve member to its open position. The valve member is in its open position when the injection tip is coupled to the injection device.

The injection tip also includes an injection needle having forward and rearward ends with the rearward end of the injection needle being secured to the forward end of the body portion of the injection tip. The injection needle has a fourth liquid passageway formed therein with forward and rearward ends. The rearward end of the fourth liquid passageway in the injection needle is in communication with the forward end of the third passageway of the body portion of the injection tip. The injection needle has a wedge shape at its outer end and has a liquid discharge opening formed therein adjacent its forward end on the top and/or bottom of the flat part of the needle which is in communication with the fourth liquid passageway in the injection needle.

In use, the injection tip is inserted into the quick coupler at the forward end of the injector which causes the valve member to be moved to its open position. The injector is then moved forwardly with respect to the tree so that the needle penetrates the tree. The injector is then operated to pump or force liquid through the injection tip and the needle thereon into the tree. The injector is then disconnected from the injection tip so that the injection tip remains attached to the tree. As the injector is disconnected from the injection tip, the valve member is moved to its closed position.

A series of injection tips are sequentially secured to the injector with the injection tips being embedded in the tree around the circumference thereof. When all of the injection tips have been embedded into the tree, the operator may depress the valve actuator to open the valve in the injection tip to determine if there is any back pressure remaining in the injection tip. If there is no liquid pressure in the tree adjacent the needle of the injection tip, the injection tip may be removed from the tree. If there is still liquid pressure within the tree, the injection tip remains in the tree until that pressure has diminished. That procedure is performed with respect to all of the injection tips in the tree.

It is therefore an object of the present invention to provide an improved tree injection apparatus.

Another object of the present invention is to provide an improved tree injection method which will cause relatively little damage to a tree.

Yet another object of the present invention is to provide a tree injection apparatus which is relatively light in weight and easily portable.

Still another object of the present invention is to provide a tree injection apparatus which uses an elongated needle with a flat wedge-shaped part at its outer end having a fluid outlet hole on the top and/or the bottom of the flat part of the needle to allow efficient, one-step injection of trees.

A further object of the invention is to provide an injection tip, the needle thereof which may be left in the tree until the liquid chemical injected into the tree has been absorbed by the tree.

Finally, an object of the present invention is to provide an apparatus and method for tree injection wherein the apparatus is relatively simple to manufacture and safe and efficient in use, and the method which is both time efficient and cost efficient.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
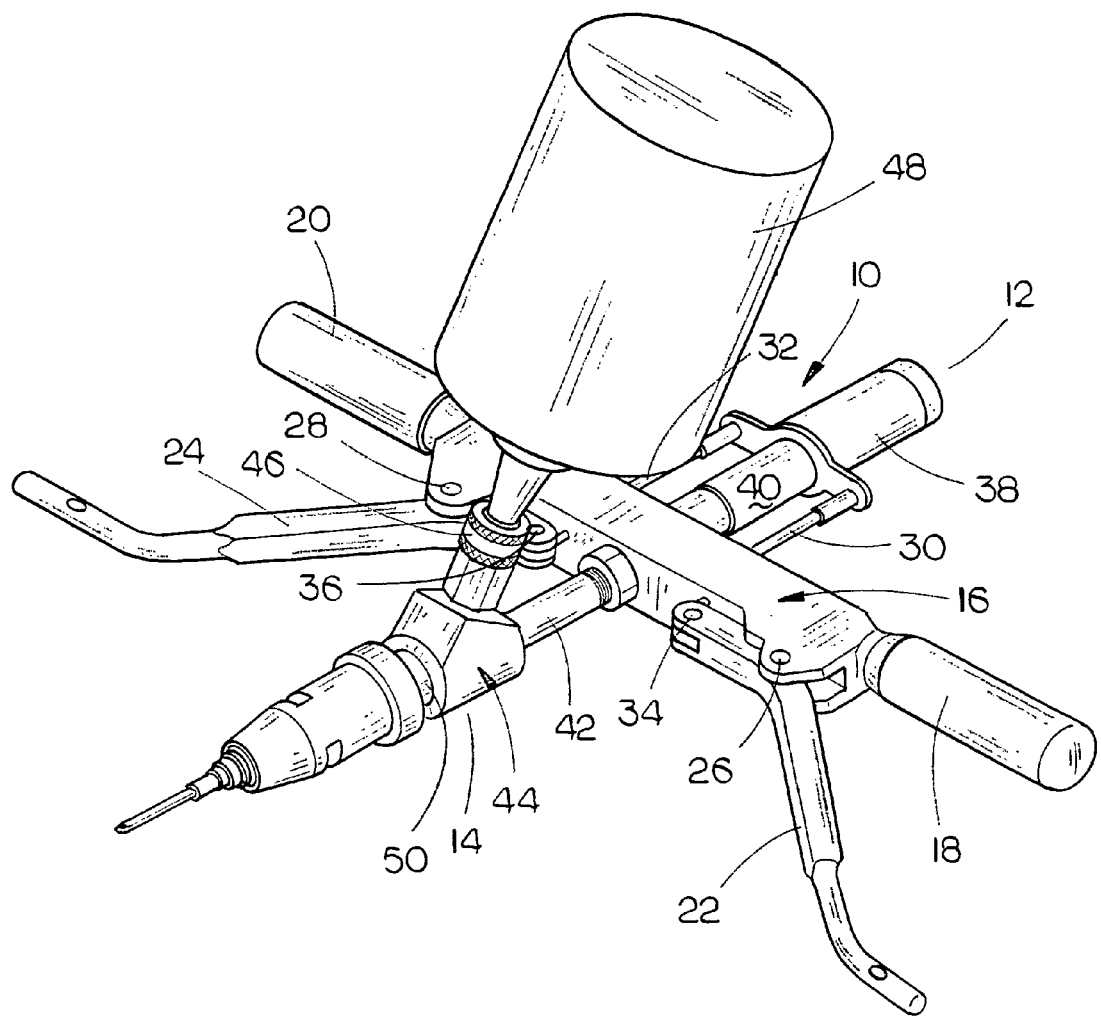
FIG. 1 is a front perspective view of an injection device having the injection tip of this invention mounted thereon.

The numeral 10 refers to a chemical injector device such as manufactured and sold by ArborSystems of Omaha, Nebr. Only a small change has been made to the prior art injector device 10 as will be described in detail hereinafter. Injector device 10 will be described as having a rearward end 12 and a forward end 14. Injector device 10 includes a transversely extending main frame 16 having handles 18 and 20 at the opposite ends thereof. Operating levers 22 and 24 are pivotally secured to the main frame at 26 and 28 respectively. Rods 30 and 32 are pivotally connected to levers 22 and 24 at 34 and 36 respectively. Rods 30 and 32 are connected to a hollow plunger 38 as seen in FIG. 1. Plunger 38 slidably embraces one end of a hollow tube 40 which extends rearwardly from main frame 16. The interior of tube 40 is in communication with a hollow tube 42 which extends forwardly from main frame 16. A fitting 44 embraces tube 42 and is in liquid communication with the interior of tube 42. A conventional quick-connector coupler 46 extends from fitting 44 with the interior thereof being in liquid communication with the interior of fitting 44. The coupler 46 is designed to have a liquid chemical container 48 quickly connected thereto in conventional fashion.

A conventional quick-connect coupler 50 is secured to the forward end of fitting 44, the interior of which is in liquid communication with the interior of fitting 44 and container 48 so that liquid chemical may be supplied to the forward end of coupler 50 by way of bore 52. The inner end of the bore 52 of coupler 50 has a protrusion 53. Except for the protrusion 53, the injector device 10 is prior art. When the operating handles 22 and 24 are depressed, plunger 38 will move forwardly to cause liquid to be pumped from the container 48 through fitting 44 and outwardly from the bore 52 of coupler 50.

Figure 2:
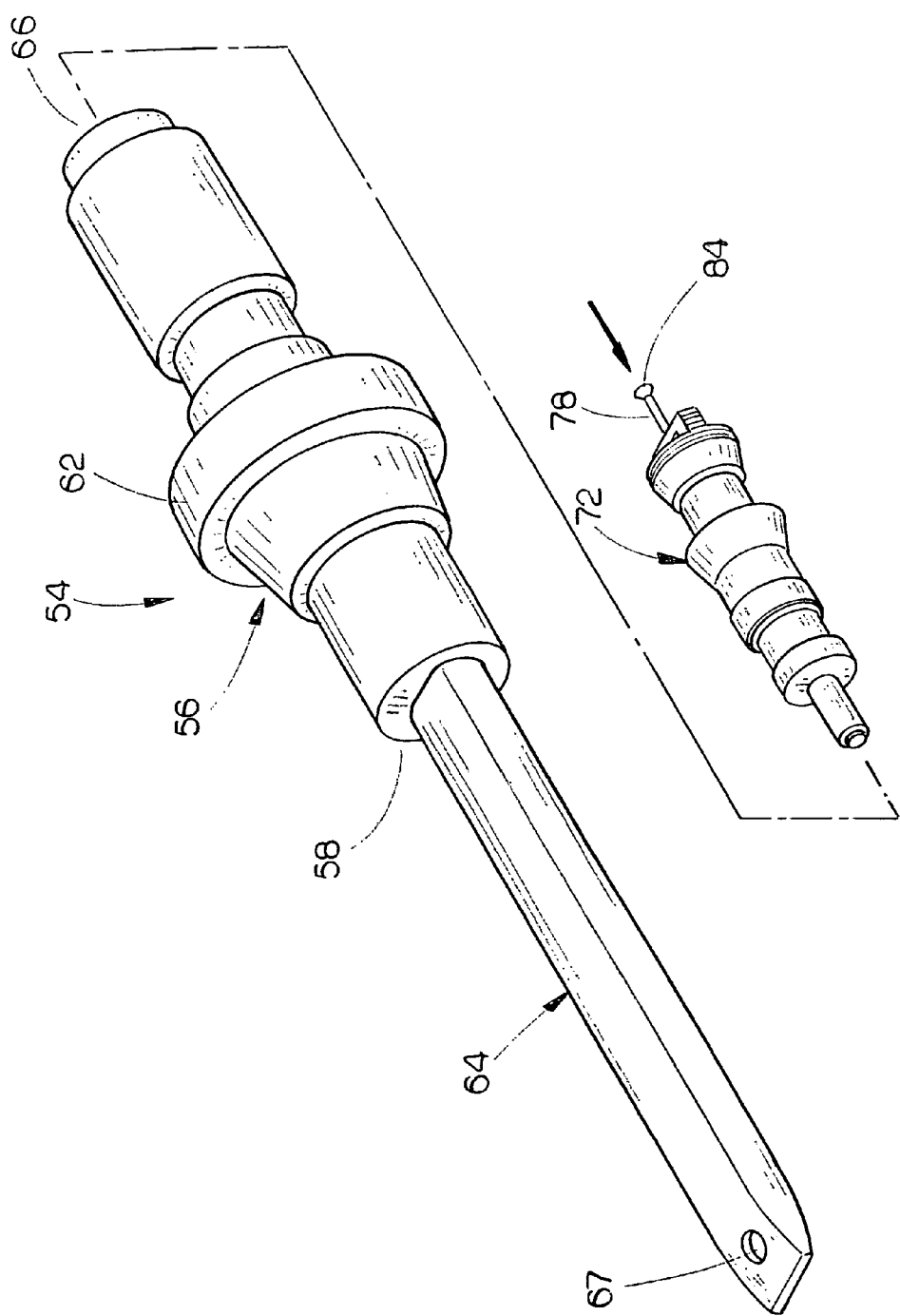
FIG. 2 is an exploded perspective view of the injection tip of this invention.
Figure 3:
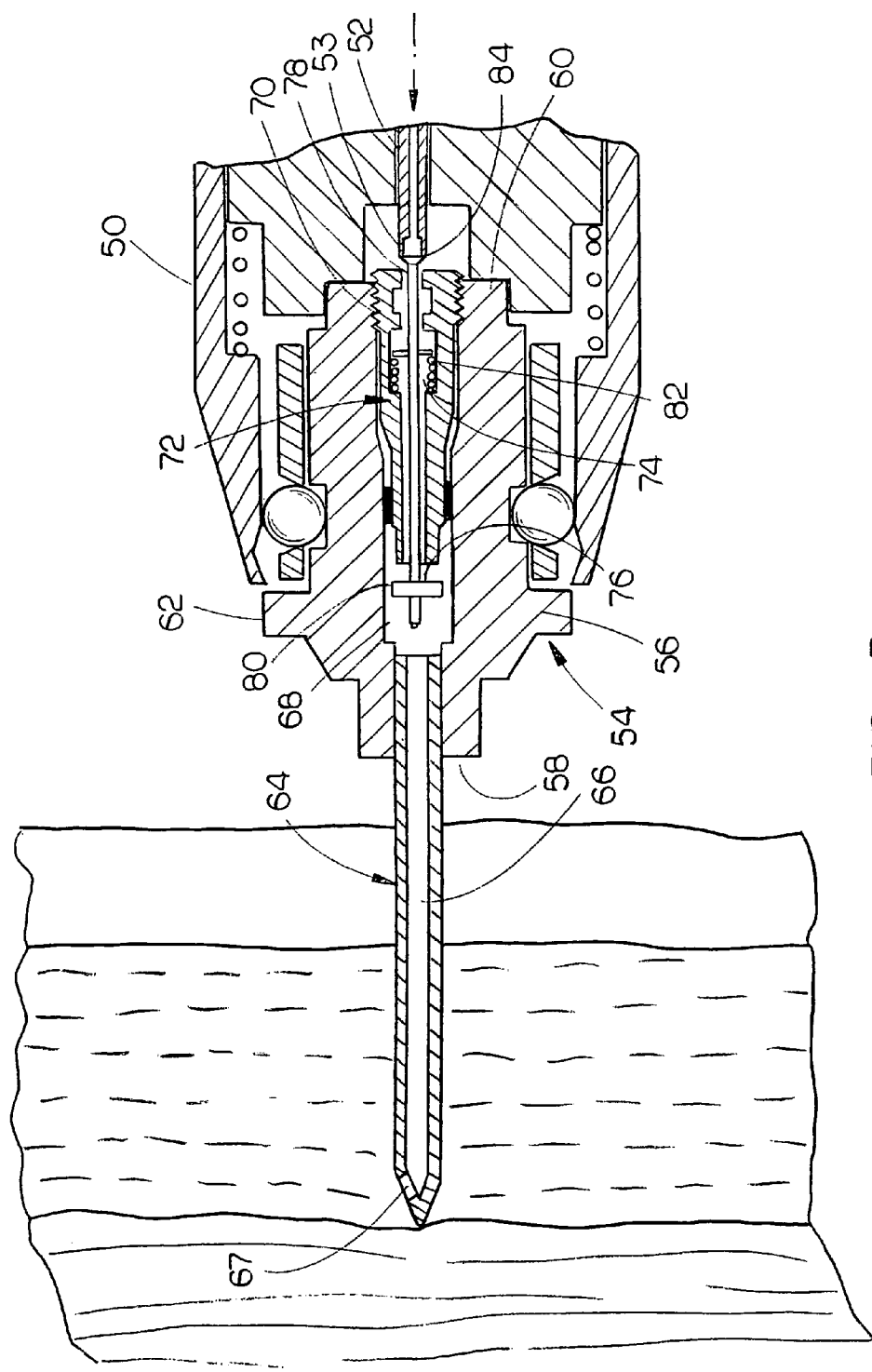
FIG. 3 is a sectional view illustrating the injection needle of the injection tip being inserted into a tree by the injection device.
Figure 4:
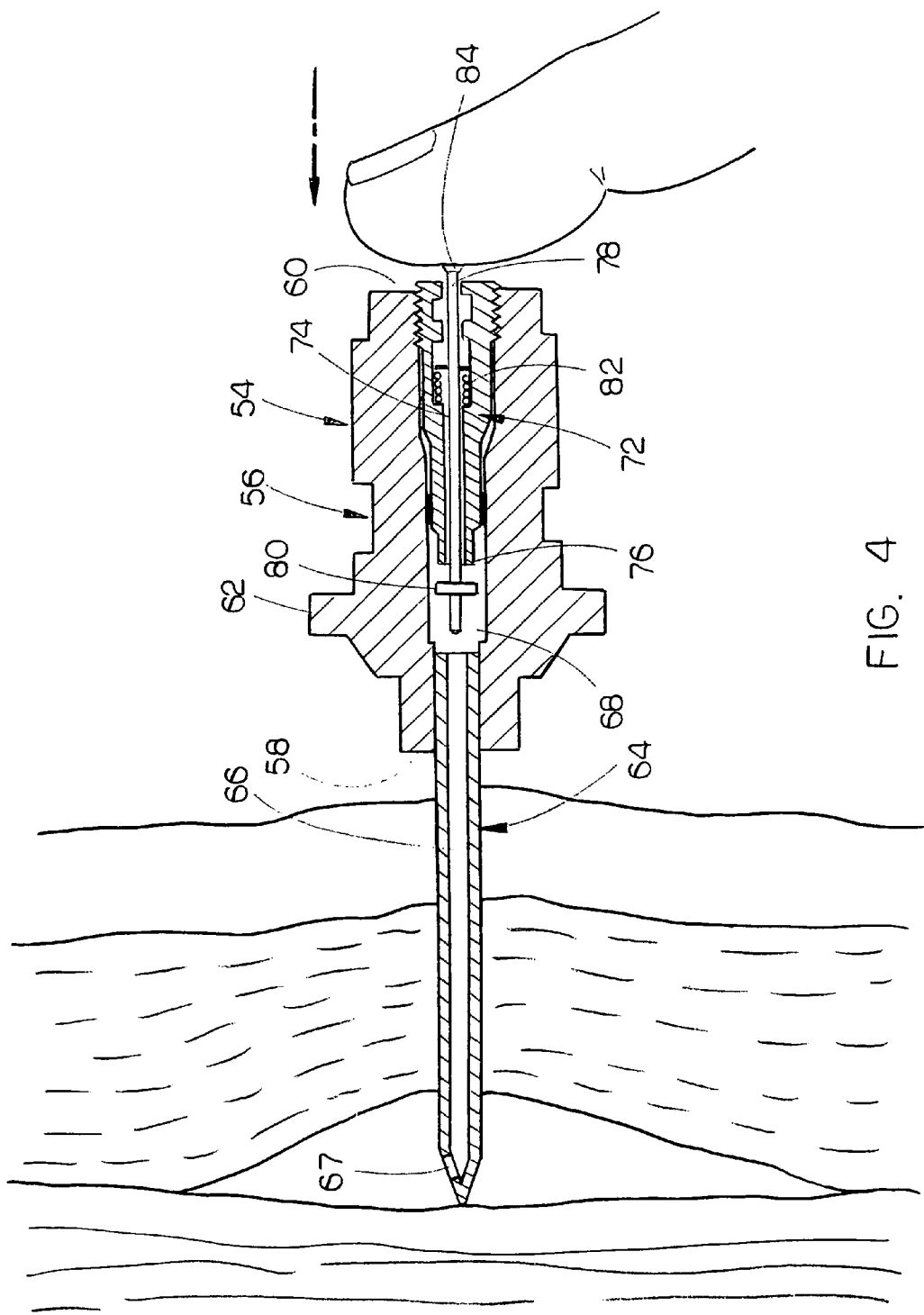
FIG. 4 is a view similar to FIG. 3 except that the injection device has been disconnected from the injection tip.

The injection tip of this invention is referred to by the reference numeral 54. Injection tip 54 will be described as including a body portion 56 having a forward end 58 and a rearward end 60. The injection tip 54 has its rearward end portion conventionally shaped so as to be selectively receivable in the forward end of coupler 50, as seen in FIG. 3. Body portion 56 has an annular shoulder 62 protruding outwardly therefrom. Injection tip 54 includes an elongated needle 64, which extends forwardly therefrom. As seen in FIG. 2, needle 64 has a wedge shaped configuration at its outer end. A passageway 66 extends through needle 64 from its rearward end to its forward end with the forward end of passageway 66 communicating with an opening 67 formed in the tope and/or bottom of the flat part of the needle 64. The rearward end of passageway 66 in injection tip 54 communicates with a passageway 68 which extends through body portion 56. The rearward end of passageway 68 is internally threaded at 70 which threadably receives a valve core 72 such as commonly found in valve stems of vehicle tires.

Valve core 72 includes a passageway 74 formed therein which defines a valve seat 76 at its forward end. A valve actuator or rod 78 is longitudinally movably positioned in passageway 74 and has a valve 80 at its forward end which normally closes valve seat 76. Spring 82 yieldably urges valve actuator 78 rearwardly in passageway 74 to yieldably maintain valve 80 in its closed position in conventional fashion. As seen in FIGS. 2 and 3, the rearward end 84 of valve actuator 78 protrudes rearwardly from the rearward end of the valve core 72. When valve actuator 78 is moved inwardly and forwardly in valve core 72, valve 80 unseats from valve seat 76.

The tree is injected as follows. An injection tip 54 is inserted into the quick coupler 50 on the injector 10. When the injection tip 54 is connected to the coupler 50, the projection 53 engages the rearward end 84 of valve actuator 78 so as to move the valve actuator 78 forwardly to cause valve 80 to unseat from valve seat 76. Injector 10 is then moved towards the tree so that the injection needle 64 is driven into the tree as illustrated in FIG. 3. The injector 10 is then operated to inject a predetermined amount of liquid chemical into the tree. With the injection needle 64 embedded in the tree and the injection tip 54 attached thereto, the quick coupler 50 is disconnected from the injection tip 54 which causes the valve 80 to move to its closed position since the protrusion 53 is no longer engaged with the rearward end 84 of the valve actuator 78.

Additional injection tips 54 are sequentially secured to the injector 10 so that the injection needles 64 are driven into the tree around the circumference thereof. When the injection needles 64 of the injection tips 54 have been embedded into the tree around the circumference thereof, and the liquid chemical has been injected into the tree, and the injector 10 is removed from the last injection tip 54, the operator will then return to the first injection tip 54 which is still attached to the tree. The operator will then manually depress the valve actuator 78 by pushing inwardly on the rearward end 84 thereof so that valve 80 of the injection tip 54 is moved to its open position. If there is still liquid chemical pressure within the tree, that pressure will be sensed at the rearward end of the valve actuator 78. If liquid chemical pressure is still present within the tree at the location of the injection needle 64, the operator will release the inward pressure on the valve actuator 78 to close the valve 80. If the liquid chemical pressure within the tree at the location of the opening 74 of the needle 64 has diminished, the injection tip 54 and the needle 64 attached thereto will be removed from the tree. Those steps are sequentially performed on the remaining injection tips. Thus, an injection tip has been provided which enables the operator to determine if the liquid chemicals have been sufficiently absorbed within the tree so that the injection tip 54 may be removed from the tree.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
an injector for injecting liquid chemicals directly into the trunk of a tree;
said injector having forward and rearward ends;
said injector having a quick coupler at its forward end which has a first liquid passageway formed therein;
said injector having a second liquid passageway formed therein which communicates with said first liquid passageway and which extends therefrom;
said second liquid passageway being in communication with the liquid chemical to be injected into the tree;
an injection tip including a body portion having forward and rearward ends;
said rearward end of said body portion of said injection tip being adapted to be received by said quick coupler of said injector;
said body portion of said injection tip having a third liquid passageway formed therein extending therethrough which has forward and rearward ends;
a normally closed, spring loaded valve assembly selectively removably secured in said rearward end of said third liquid passageway;
said valve assembly including a valve seat, having a rearward liquid intake side and a forward liquid discharge side, a movable valve member positioned forwardly of said valve seat which is movable between open and closed positions with respect to said liquid discharge side of said valve seat, a spring associated with said valve member which yieldably maintains said valve member in its said closed position, and an elongated valve actuator having forward and rearward ends;
said forward end of said valve actuator being operatively secured to said valve member;
said valve actuator extending rearwardly from said valve member;
said rearward end of said valve actuator being positioned rearwardly of said rearward end of said body portion of said injection tip so that said valve actuator may be manually moved forwardly to move said valve member to its said open position;
said valve member being in said open position when said injection tip is coupled to said injection device;
and an injection needle having forward and rearward ends;
said rearward end of said injection needle being secured to said forward end of said body portion of said injection tip;
said injection needle having a fourth liquid passageway formed therein with forward and rearward ends;
said rearward end of said fourth liquid passageway in said injection needle being in communication with said forward end of said third liquid passageway of said body portion of said injection tip;
said injection needle having a wedge shape at its forward end;
said injection needle having a liquid discharge opening formed therein adjacent its said forward end which is in communication with said fourth liquid passageway in said injection needle.

2. In combination:
an injector for injecting liquid chemicals directly into the trunk of a tree;
said injector having forward and rearward ends;

said injector having a quick coupler at its forward end which has a first liquid passageway formed therein;

said injector having a second liquid passageway formed therein which communicates with said first liquid passageway and which extends therefrom;

said second liquid passageway being in communication with the liquid chemical to be injected into the tree;

an injection tip including a body portion having forward and rearward ends;

said rearward end of said body portion of said injection tip being adapted to be received by said quick coupler of said injector;

said body portion of said injection tip having a third liquid passageway formed therein extending therethrough which has forward and rearward ends;

a normally closed, spring loaded valve assembly selectively removably secured in said rearward end of said third liquid passageway;

said valve assembly including a valve seat, having a rearward liquid intake side and a forward liquid discharge side, a movable valve member positioned forwardly of said valve seat which is movable between open and closed positions with respect to said liquid discharge side of said valve seat, a spring associated with said valve member which yieldably maintains said valve member in its said closed position, and an elongated valve actuator having forward and rearward ends;

said forward end of said valve actuator being operatively secured to said valve member;

said valve actuator extending rearwardly from said valve member;

said rearward end of said valve actuator being positioned rearwardly of said rearward end of said body portion of said injection tip so that said valve actuator may be manually moved forwardly to move said valve member to its said open position;

said valve member being in said open position when said injection tip is coupled to said injection device;

and an injection needle having forward and rearward ends;

said rearward end of said injection needle being secured to said forward end of said body portion of said injection tip;

said injection needle having a fourth liquid passageway formed therein with forward and rearward ends;

said rearward end of said fourth liquid passageway in said injection needle being in communication with said forward end of said third liquid passageway of said body portion of said injection tip;

said injection needle having a liquid discharge opening formed therein adjacent its said forward end which is in communication with said fourth liquid passageway in said injection needle.

3. The method of injecting liquid chemicals into a tree, comprising the steps of:

(1) providing a chemical injector, which is in fluid communication with a source of liquid chemicals and which has a female coupler thereon with the female coupler being in fluid communication with the source of liquid chemical;

(2) providing an injection tip having a body portion with forward and rearward ends, a fluid passageway extending therethrough, a normally closed, spring-loaded valve core including a valve, which is movable between open and closed positions, in the rearward end of the fluid passageway and which has a valve actuator, having forward and rearward ends, connected to the valve with the rearward end of the valve actuator protruding rearwardly from the rearward end of the body portion of the injection tip, an elongated injection needle having rearward and forward ends with a fluid passageway extending therethrough, which may be placed in fluid communication with the passageway body portion of the injection tip, a liquid discharge opening at the forward end of the injection needle which communicates with the fluid passageway in the injection needle, and a male coupler structure on the rearward end of the body portion;

(3) coupling the female coupler onto the male coupler structure on the body portion of the injection tip which causes the valve to move from its closed position to its open position;

(4) driving the injection needle into the tree;

(5) injecting a predetermined amount of liquid chemical into the tree;

(6) disconnecting the female coupler from the male coupler so that the injection tip remains attached to the tree with the injection needle embedded in the tree and so that the valve moves to its closed position;

(7) repeating steps 3-6 at different locations around the tree;

(8) sequentially manually depressing the valve actuators on the injection tips so that the valve therein is opened to enable the operator to determine if the liquid chemical pressure at that location in the tree has diminished; and (9) allowing the valve to close if the liquid chemical pressure has not diminished or removing the injection tip from the tree if the liquid chemical pressure in the tree has sufficiently diminished.

\* \* \* \* \*